(12) United States Patent
Palacios

(10) Patent No.: US 6,863,533 B2
(45) Date of Patent: Mar. 8, 2005

(54) READING TEACHING AID

(76) Inventor: Ronaldo J. Palacios, 4714 5th St., NW., Washington, DC (US) 20011

( * ) Notice: Subject to any disclaimer, the term of this patent is extended or adjusted under 35 U.S.C. 154(b) by 0 days.

(21) Appl. No.: 10/453,515

(22) Filed: Jun. 4, 2003

(65) Prior Publication Data
US 2004/0248069 A1 Dec. 9, 2004

(51) Int. Cl.7 .............................................. G09B 17/00
(52) U.S. Cl. ....................................... 434/178; 434/182
(58) Field of Search ................................ 434/169–170, 434/178, 180–183

(56) References Cited

U.S. PATENT DOCUMENTS

| 203,988 | A | 5/1878 | Bailey |
| 502,183 | A | 7/1893 | Gallegos |
| 572,972 | A | 12/1896 | Eckhardt |
| 2,982,032 | A | 5/1961 | Cooke |
| 3,279,098 | A | 10/1966 | Taylor |
| 3,670,428 | A | 6/1972 | Hall |
| 3,950,863 | A | 4/1976 | Pallishusky |
| 4,008,529 | A | 2/1977 | Yorkston |
| 4,196,529 | A | 4/1980 | Esbensen |
| 5,133,665 | A | 7/1992 | Engel et al. |
| 5,451,163 | A | 9/1995 | Black |
| 5,584,698 | A | 12/1996 | Rowland |
| 2003/0228559 | A1 * | 12/2003 | Hajjar et al. ................. 434/169 |

* cited by examiner

Primary Examiner—Kim Nguyen
(74) Attorney, Agent, or Firm—Richard C. Litman

(57) ABSTRACT

The reading teaching aid is a transparent substantially right triangle shaped sheet, preferably plastic. The sheet has linear legs and a staircase shaped hypotenuse. The sheet is used to teach a learner to read symbols, such as letters, characters, syllables or words, by covering the symbols with the sheet thereby highlighting the symbol(s) to be read. The stepped shape permits the user to successively highlight larger groups of adjacent symbols to learn to read or pronounce progressively larger groups of the symbols.

13 Claims, 8 Drawing Sheets

US 6,863,533 B2

READING TEACHING AID

BACKGROUND OF THE INVENTION

1. Field of the Invention

The present invention relates to educational devices for improving literacy. More particularly, the invention is a transparent colored sheet having a generally triangular shape that is usable for sequentially highlighting various portions of written script, i.e., a linearly arranged set of adjacent symbols, e.g., letters, characters or syllables. The invention is useful for teaching a child how to read a word by sequentially highlighting groups of symbols (e.g., letters in the word) and asking the child to pronounce the highlighted symbols in sequence, each subsequent group including the previous group as well as one or more additional symbols.

2. Description of the Related Art

A wide variety of teaching aids for improving literacy are known, including those using plastic see-through windows that highlight a word or a portion of a word.

U.S. Pat. No. 203,988, issued to Bailey on May 21, 1878, teaches an educational device consisting of a rotatable disc for learning the alphabet. U.S. Pat. No. 502,183, issued to Gallegos on Jul. 25, 1893, teaches a teaching aid for learning spelling and numbers and includes a sliding glass pane which selectively covers portions of a word.

U.S. Pat. No. 572,972, issued to Eckhardt on Dec. 15, 1896, teaches an educational device for teaching a child to progressively pronounce letters in a word as the letters are successively exposed. U.S. Pat. No. 2,982,032, issued to Cooke on May 2, 1961, teaches an educational aid for learning syllables of words.

U.S. Pat. No. 3,279,098, issued to Taylor on Oct. 18, 1966, discloses a method for teaching letter and word sequences using an audio-visual aid. U.S. Pat. No. 3,670,428, issued to Hall on Jun. 20, 1972, discloses an educational aid for learning to tell time.

U.S. Pat. No. 3,950,863, issued to Pallishusky on Apr. 20, 1976, teaches an educational aid to learn the alphabet using a set of stackable transparent sheets. U.S. Pat. No. 4,008,529, issued to Yorkston on Feb. 22, 1977, teaches an educational aid using a set of transparent sheets that are sequentially applied in accordance with the "vanishing technique".

U.S. Pat. No. 4,196,529, issued to Esbensen on Apr. 8, 1980, discloses a teaching aid for literacy using a sheet with a plurality of windows. U.S. Pat. No. 5,133,665, issued to Engel et al. on Jul. 28, 1992, discloses a teaching book for learning to spell using a series of overlapping pages the successively display letters.

U.S. Pat. No. 5,451,163, issued to Black on Sep. 19, 1995, discloses a teaching aid for learning reading and pronunciation in which a video tape recorder and a monitor are used to progressively display highlighted symbols or characters. U.S. Pat. No. 5,584,698, issued to Rowland on Dec. 17, 1996 teaches a method and apparatus for improving reading efficiency using transparent colored sheets.

However, none of the above prior art teaches the transparent colored reading teaching aid of the present invention having a generally triangular shape and having a staircase edge None of the above inventions and patents, taken either singly or in combination, is seen to describe the instant invention as claimed. Thus a reading teaching aid solving the aforementioned problems is desired.

SUMMARY OF THE INVENTION

The reading teaching aid is a transparent, substantially triangularly shaped sheet, preferably plastic. Viewed as a triangle, the edges of the sheet form a right triangle having two linear legs, and a staircase-shaped hypotenuse. The sheet is used to teach a learner to read symbols, such as letters, characters, syllables or words, by covering the symbols with the sheet, thereby highlighting the symbol(s) to be read. The stepped shape permits the user to successively highlight larger groups of adjacent symbols to learn to read or pronounce by sliding the sheet to highlight progressively larger groups of the symbols.

Accordingly, it is a principal object of the invention to provide a reading teaching aid in the form of a transparent sheet having the general shape of a right triangle with linear legs and a staircase-shaped hypotenuse.

It is another object of the invention to provide a kit of aids for teaching reading having different dimensions and/or colors.

It is a further object of the invention to provide a method of teaching reading using an aid which is made from a transparent sheet highlighting the words, syllables, or letters to be read.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
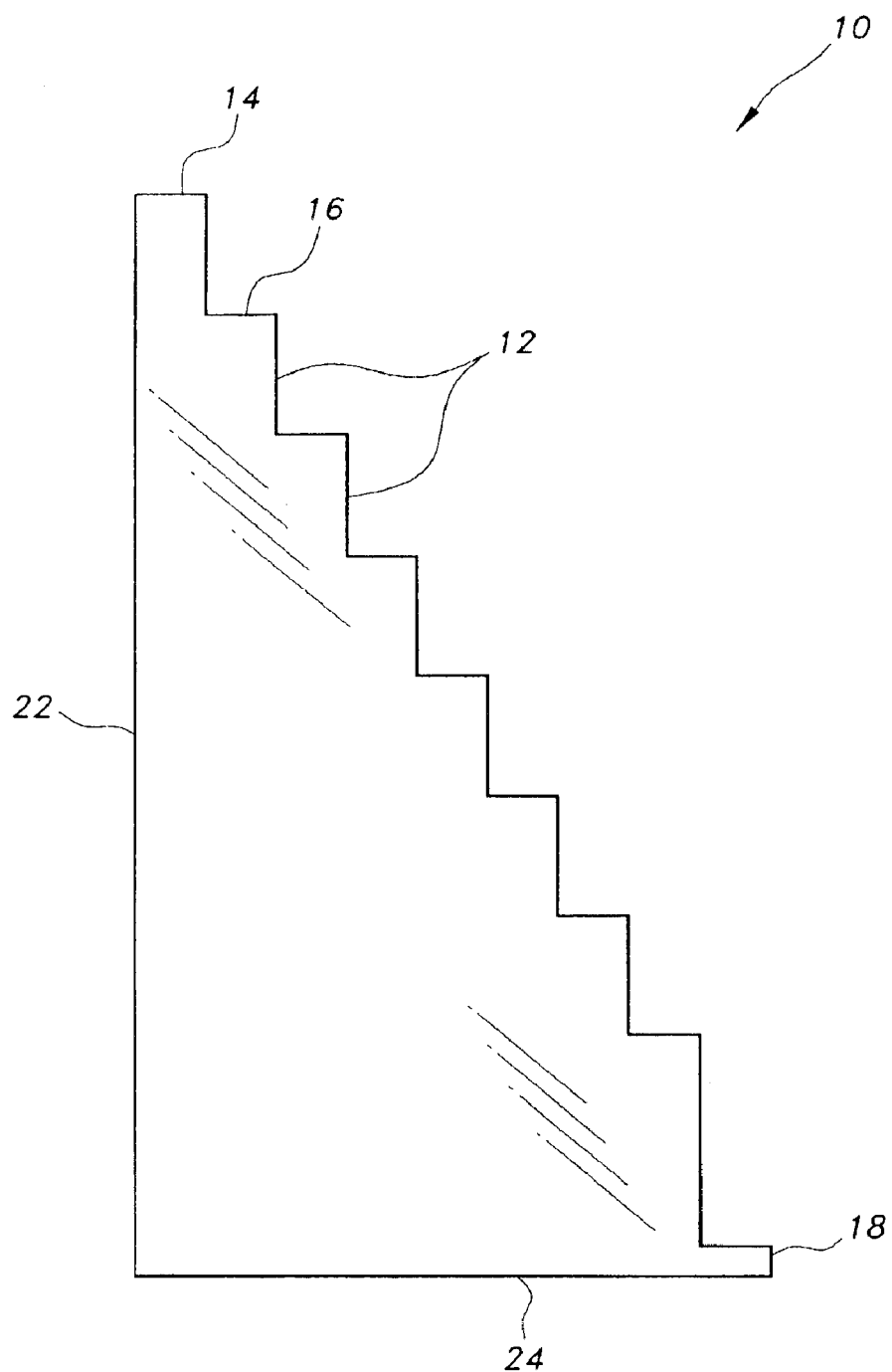
FIG. 1 is a plan view of a reading teaching aid according to the present invention.

The present invention is directed to a reading teaching aid. FIG. 1 shows a reading aid 10 in accordance with the invention. As shown, the aid 10 has a generally triangular shape in the form of a right triangle with two straight edges, 22 and 24, along a vertical and horizontal side, respectively. Along the longest edge, or hypotenuse, are a series of steps defining a staircase pattern. The top step 14 has a width and a height that corresponds to a first letter, character or syllable of a word. The second step 16 is wider (when measured from edge 22) and each succeeding step is successively wider.

The height of the steps 12 corresponds with the height of the letters or characters in the word being read. Thus, the width and height of the individual steps in the aid 10 depend upon the font used in the words being read.

For the letter "i", a special protruding tab 18 is provided. In teaching children, and particularly, non-English-speaking learners, the letter "i" poses apparent difficulty in distinguishing between the short and long "i" vowels. Therefore tab 18 can be used to highlight this letter in English words while asking the learner to correctly read the letter in various words.

Figure 2:
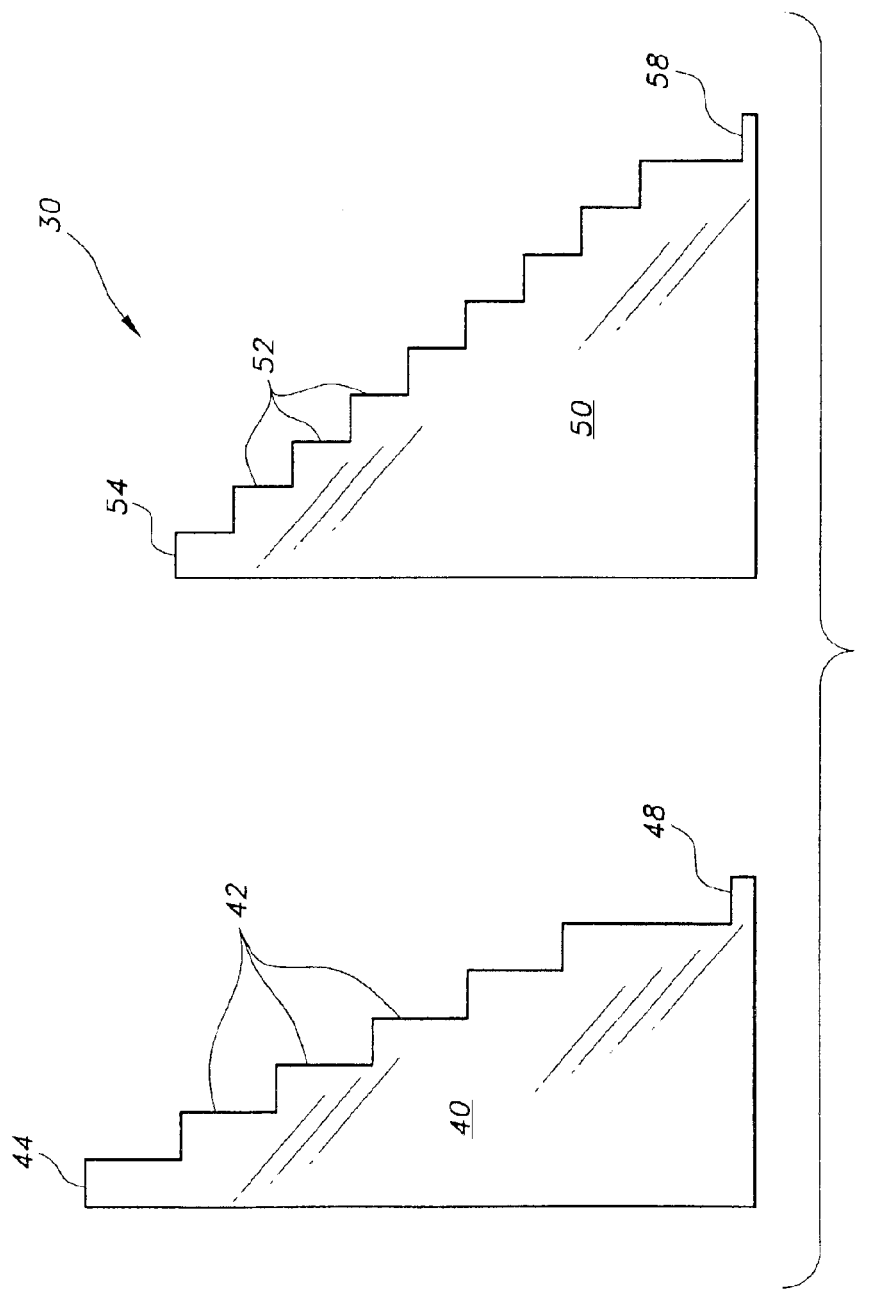
FIG. 2 is a plan view of a pair of reading teaching aids according to the invention representing a kit.

FIG. 2 shows a set 30 of two aids in accordance with the invention having different step dimensions. One aid 40 has six (6) steps; the other 50 has nine (9) steps. As in aid 10 shown in FIG. 1, the step widths, 44 and 54, and heights, 42 and 52, have dimensions that correspond with related dimensions of the fonts used in the words being read. Also, protruding tabs 48 and 58, permit the user to highlight the letter "i" in the corresponding words.

Figure 3A:
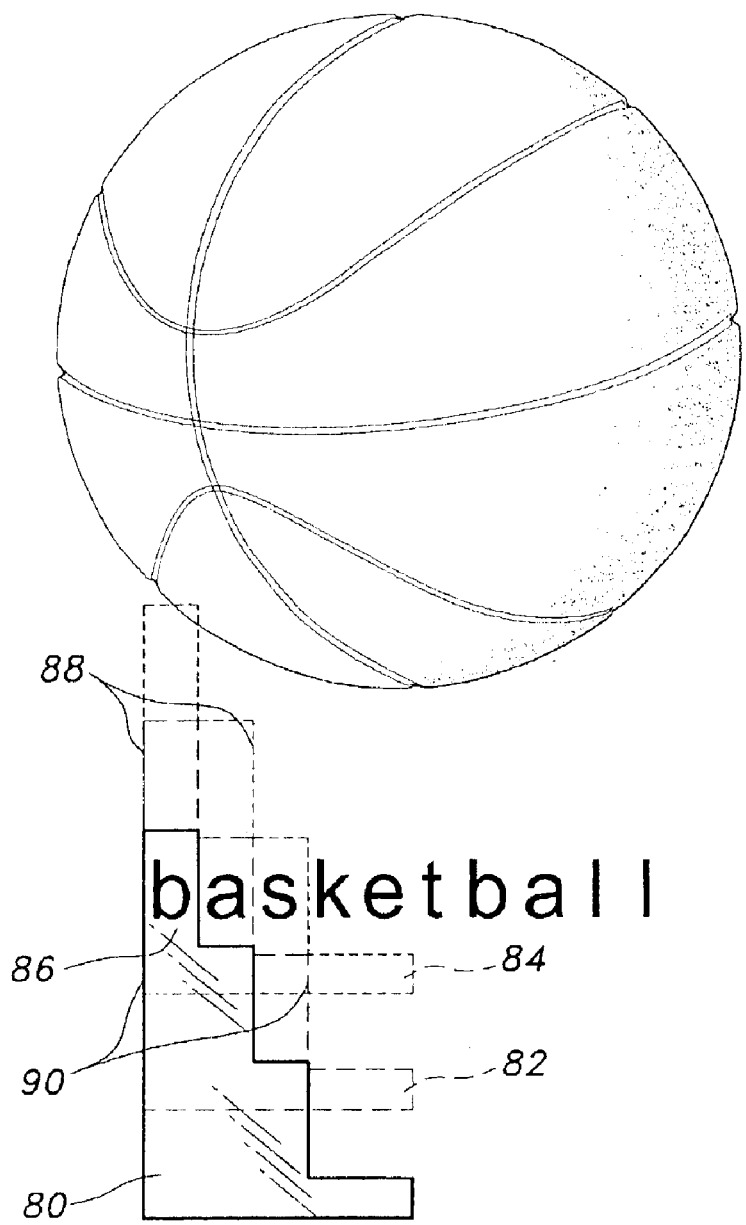
FIG. 3A is an environmental, plan view showing use of a first aid for teaching reading by individual letters of a word.

The invention also contemplates a method of using the aid. FIG. 3A shows using an aid 80 which is dimensioned so that successive steps cover indivudual letters or characters. In its first position, the topmost step 86 of aid 80 is positioned to cover the letter "b" as shown. After the learner has satisfactorily read or pronounced the letter "b", then the aid is moved to the position shown in phantom at 82, with the second step over the two letters "ba" as indicated by the phantom lines 88. After successfully reading or pronouncing the combination of the letters "ba", the aid is again moved upward. This time, the aid is positioned as indicated in phantom at 84, so that the third step covers the three letters "bas", as shown by the phantom lines at 90 in FIG. 3A.

Continuing to the next syllable, i.e., "ket", the aid 80 is moved to the right so that the letter "k" is covered by the topmost step 86 of the aid, and the teaching of the next syllable then proceeds in the same manner as was done with the first syllable.

Figure 3B:
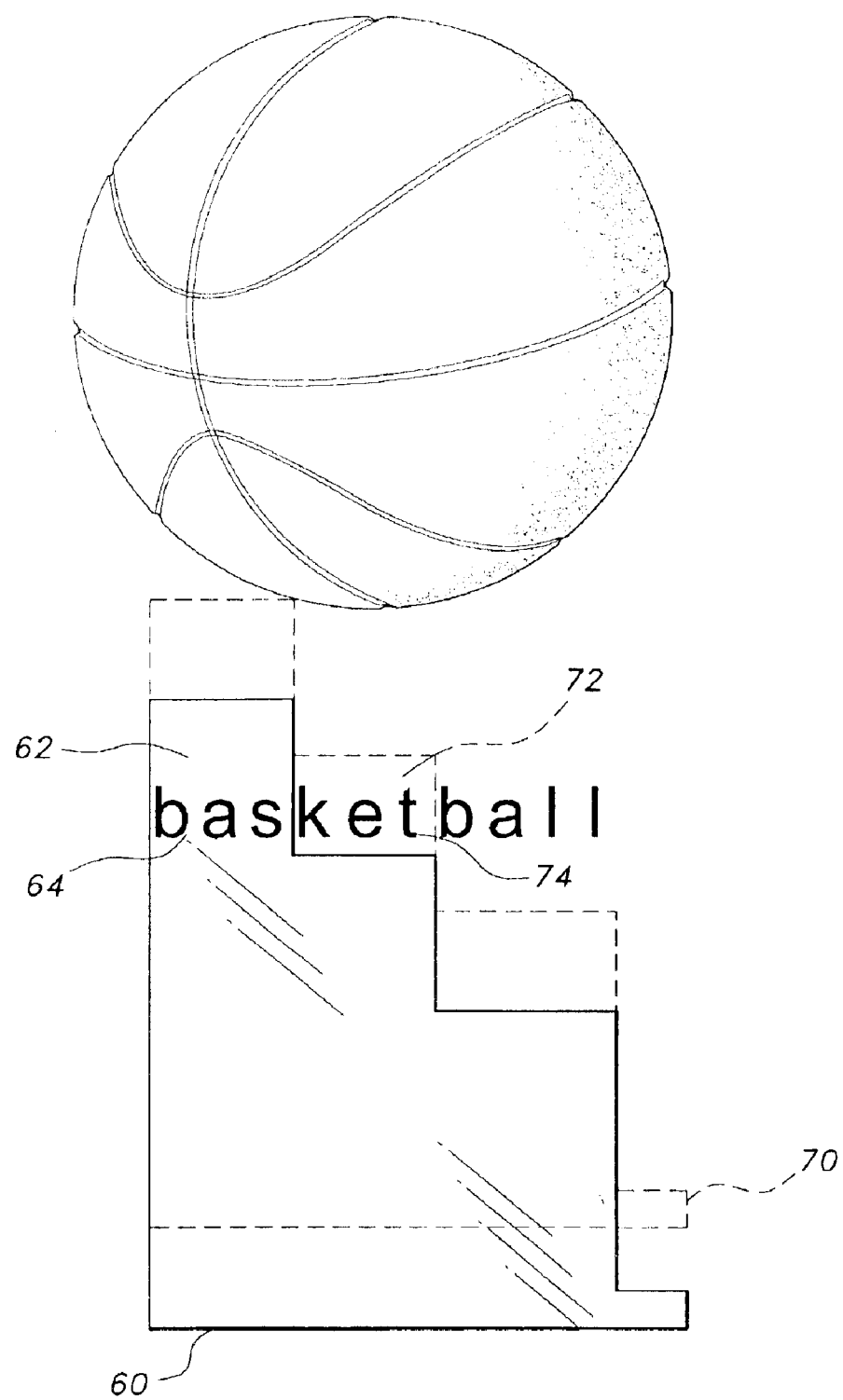
FIG. 3B is an environmental, plan view showing use of a second aid for teaching reading by the syllables of a word.

FIG. 3B shows the use of an aid 60 which is dimensioned so that successive steps cover individual syllables in order to teach a learner how to read the word "basketball" as a sequence of syllables. An image corresponding to the word can also be provided as shown above the word in the Figure. The word "basketball" contains three (3) syllables: "bas", "ket" and "ball". Initially the aid is placed on the word to highlight the first syllable, "bas" 64, with the first step 62. The learner, e.g., a child, is then asked to pronounce this syllable.

If the learner successfully pronounces this first syllable, the aid is then moved upward so that the first two syllables, "basket" 74, are covered by the second step 72. The position of the aid in this position is shown in phantom outline 70.

If both of the first two syllables are pronounced correctly by the learner, the aid is again moved upward so that the third step fully highlights the entire word, "basketball"; the placement of the aid in this position, i.e., covering the entire word, is not shown.

Figure 4:
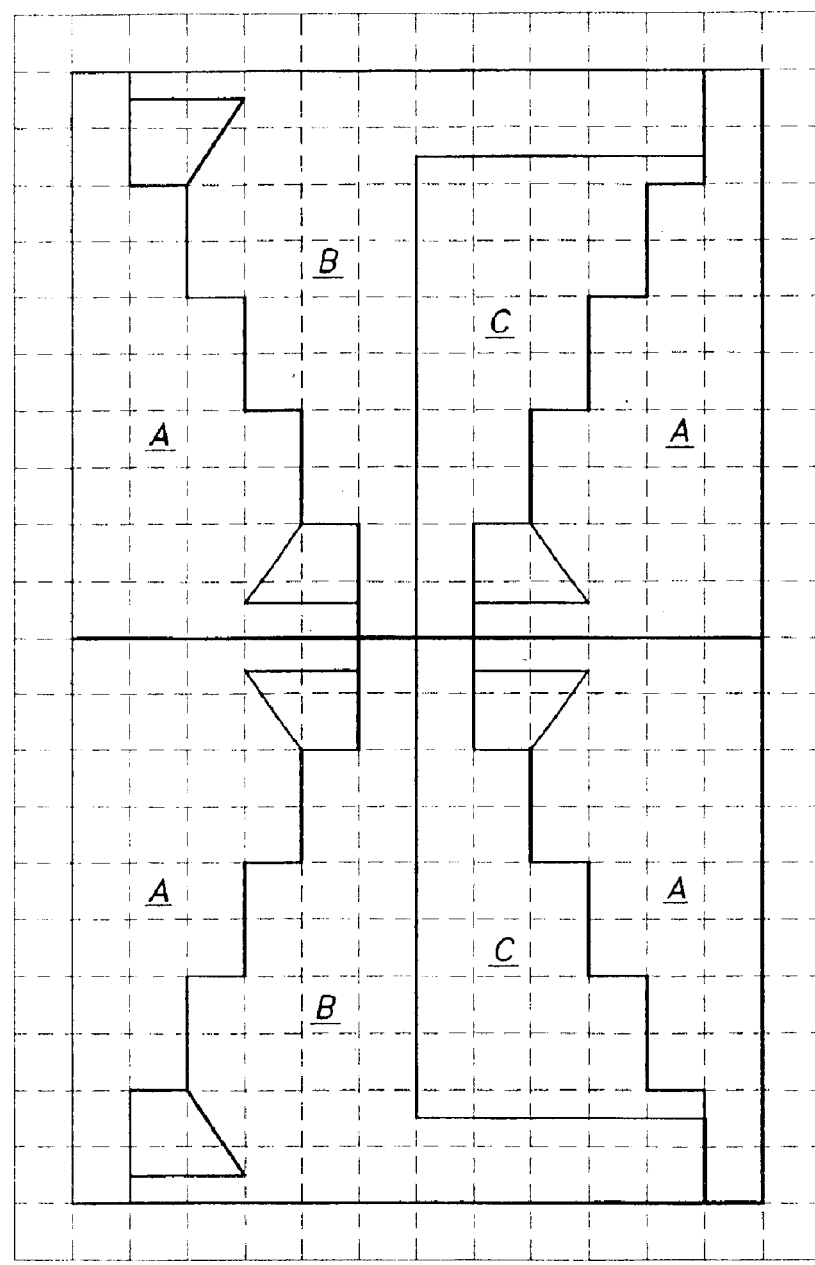
FIG. 4 is a plan view showing a template layout for producing a set of reading teaching aids.

FIG. 4 shows the layout of a template 100 used to make a set of three differently sized aids, A, B, and C. Each of the three aids, A, B, and C, are shown in FIGS. 5A, 5B, and 5C, respectively.

Figure 5A:
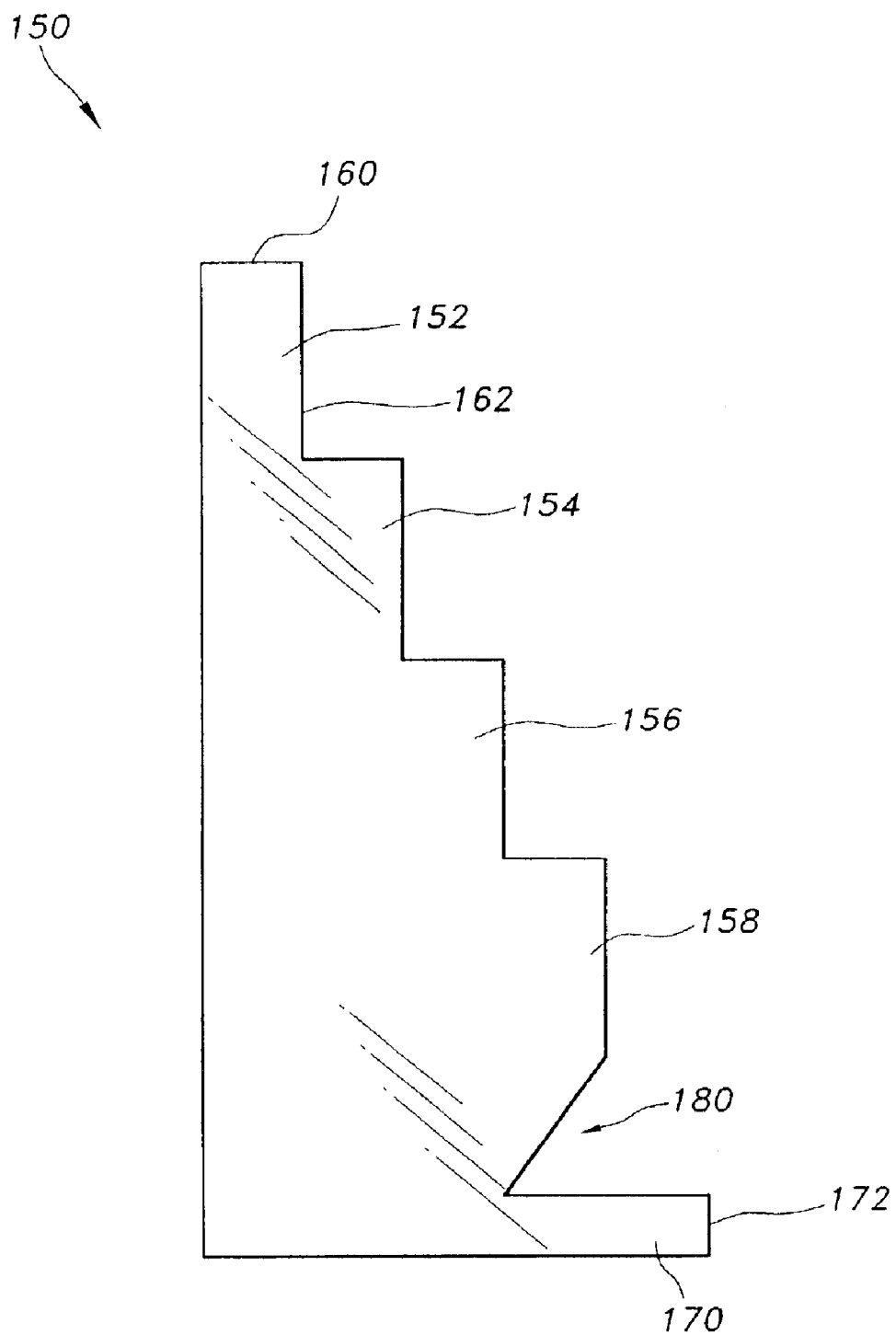
FIGS. 5A, 5B and 5C are plan views showing three alternatively shaped reading teaching aids made from the template of FIG. 4.

In FIG. 5A, the aid 150 corresponding to item A in FIG. 4, includes four steps 152, 154, 156 and 158. The aid includes a protruding tab 170 having a width dimension 172 corresponding to the width dimension of the font of the word being read.

Also, aid 150 further includes a notch 180 that partially separates the largest step 158 from tab 170. When the aid is held in an orientation that highlights a letter "i" using tab 170, the height of tab 170 is defined by one of the sides of notch 180 while the second side of notch 180 extends at an angle from the widest step 158.

Figure 5B:
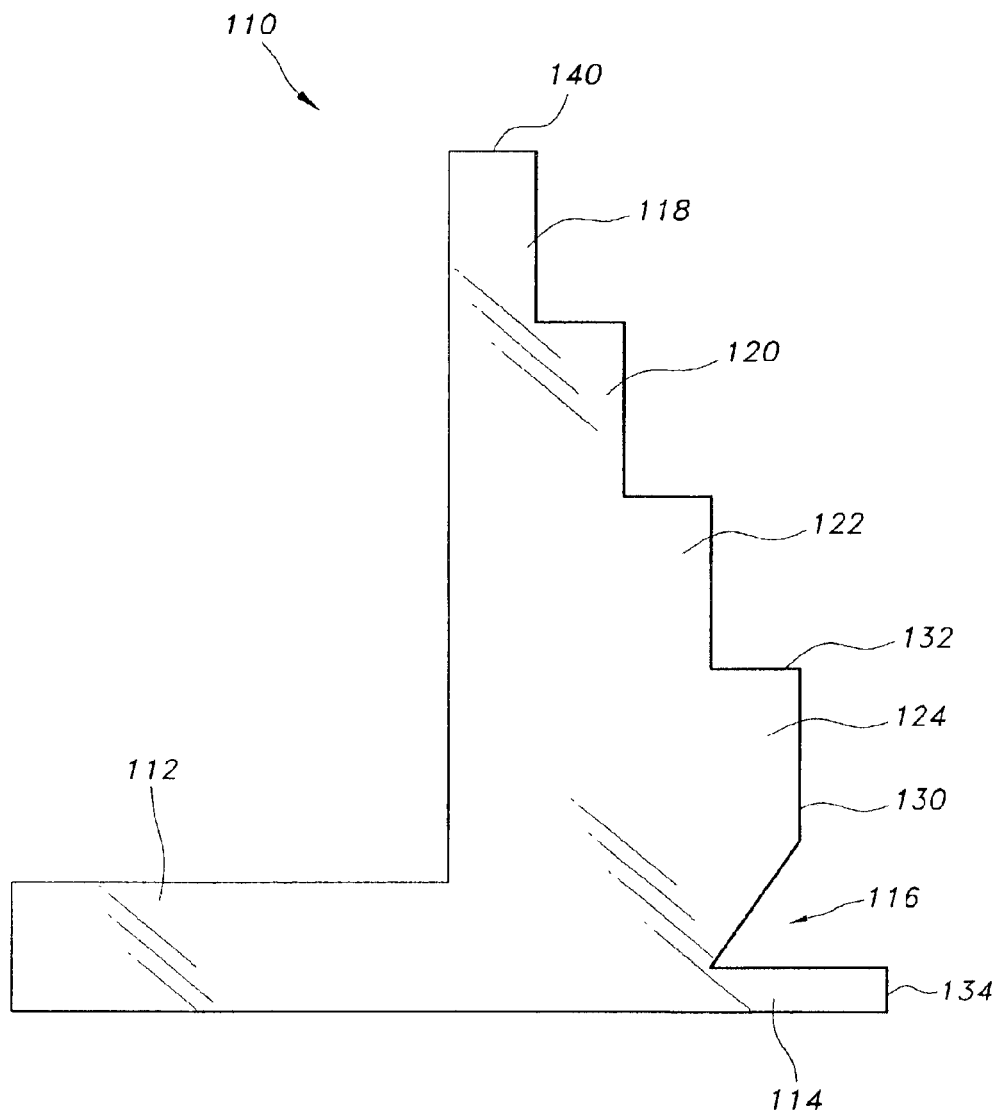
Figure 5C:
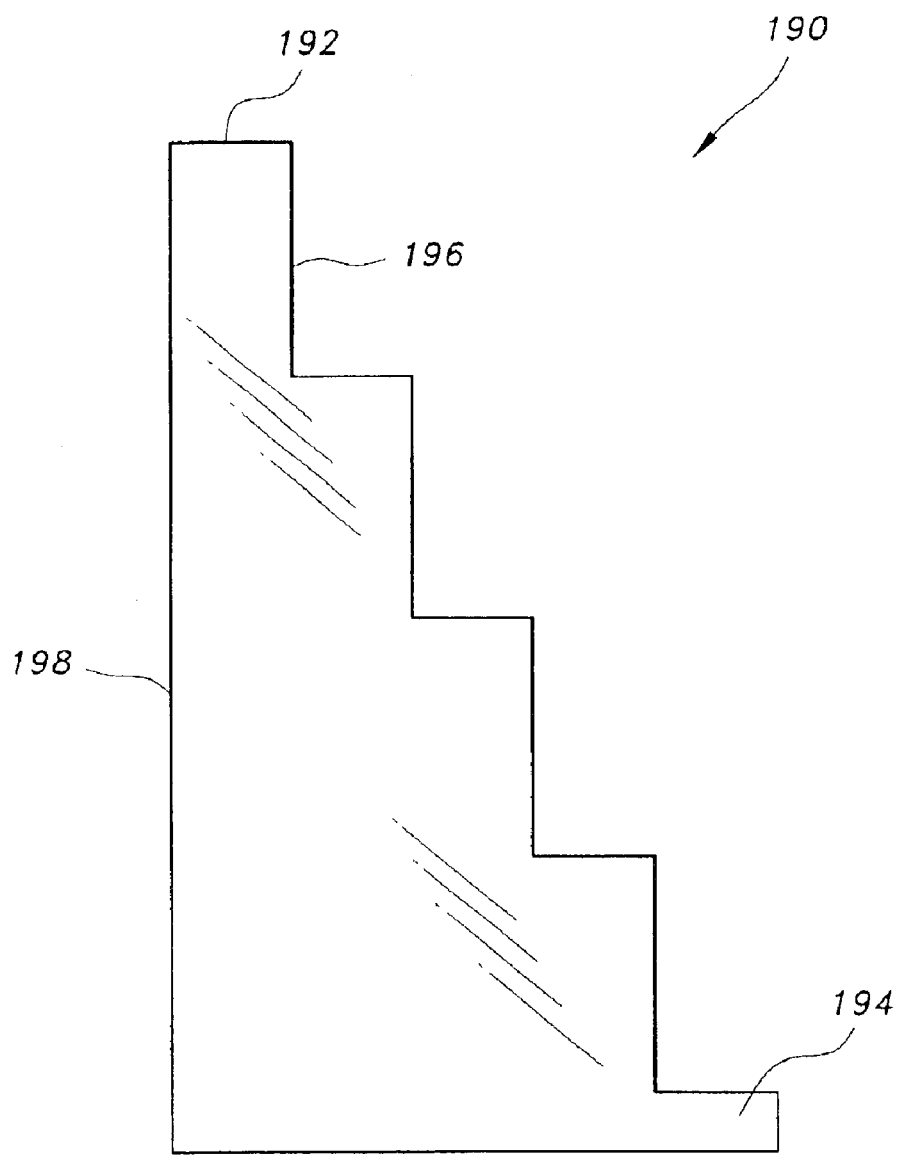

FIG. 5B shows a further modification of the reading teaching aid in accordance with the invention. The aid 110, shown in FIG. 5B, includes four steps, 118, 120, 122, and 124, in sequence according to increasing width. As in previously described aids, aid 110 includes a notch 116 that partially separates the lowest step 124 from outwardly protruding tab 114. Again the width 134 of tab 114 corresponds to the width of the letter "i".

Also, the aid of FIG. 5B includes a horizontally protruding tab 112 for highlighting a large group of symbols, such as an entire word or a set of words.

FIG. 5C shows aid 190, corresponding to aid C in FIG. 4. The step widths in this case all have the same dimension 192. Likewise, the step heights all have the same dimension 196. In this aid, the vertical edge 198 meets the lower edge directly, i.e., without a horizontally protruding tab. Horizontal tab 194 protrudes outward from the edge opposite the vertical edge, for use in highlighting the letter "i".

The aids are preferably made of a transparent plastic material and have dimensions that depend upon the font size of the written script being highlighted. Although an example was given for a word in English, the aid can be dimensioned to teach any written linearly arranged scripts. Also, a set of aids can be provided with aids having different colors and dimensions. Moreover, two aids having identical dimensions, but with different colors, can be provided so that one can be used to highlight a group of symbols and a second can be superimposed onto the first to highlight a subset of symbols for added emphasis.

Moreover, the aid or aids can be used with overhead projectors to teaching reading to a large group of learners.

It is to be understood that the present invention is not limited to the embodiments described above, but encompasses any and all embodiments within the scope of the following claims.

I claim:

1. A reading teaching aid, comprising:
   a transparent sheet having a substantially right triangular shape including two linear legs and a staircase-shaped hypotenuse, the staircase being defined by a plurality of steps, each of the steps having a vertical segment and a horizontal segment;
   whereby the sheet is adapted for being superimposed on a printed matter in order to highlight a selected portion of a word by positioning the staircase on the printed matter at an appropriate step level.

2. The reading teaching aid of claim 1, wherein the sheet is colored.

3. The reading teaching aid of claim 1, wherein the horizontal segments of the stepped edge are identical in length.

4. The reading teaching aid of claim 1, wherein the vertical segments of the stepped edge are identical in length.

5. The reading teaching aid of claim 1, further including a protruding tab extending from the sheet.

6. The reading teaching aid of claim 5, wherein the width of the protruding tab is less than the width of the horizontal segments.

7. A kit of reading teaching aids, comprising:
   a plurality of transparent sheets having a substantially right triangular shape including two linear legs and a staircase-shaped hypotenuse, the staircase being defined by a plurality of steps, each of the steps having a vertical segment and a horizontal segment;
   whereby the sheets are adapted for being superimposed on a printed matter in order to highlight a selected portion of a word by positioning the staircase on the printed matter at an appropriate step level.

8. The kit of claim 7, wherein the sheets have different dimensions.

9. The kit of claim 7, wherein the sheets have different colors.

10. A method of teaching a learner to read a plurality of linearly arranged readable symbols using a reading teaching aid comprising a transparent sheet having a substantially right triangular share including two linear legs and a staircase-shaped hypotenuse, the staircase being defined by a plurality of steps, each of the steps having a vertical segment and a horizontal segment said method comprising the steps of:

(a) placing the aid with the staircase positioned to cover a first symbol, thereby highlighting the first symbol;

(b) asking the learner to read the first symbol;

(c) moving the aid along to position the staircase to cover the first symbol and an adjacent symbol thereby highlighting the first symbol and the adjacent symbol;

(d) asking the learner to read the highlighted symbols;

(e) repeating steps (c) and (d) until all the symbols have been highlighted and read.

11. The method of claim 10, wherein the symbols are a series of letters defining a word.

12. The method of claim 10, wherein the symbols are a series of syllables defining a word.

13. The method of claim 10 wherein the symbols are a series of words defining a phrase or a sentence.

* * * * *